(12) United States Patent
Panter et al.

(10) Patent No.: US 12,468,324 B2
(45) Date of Patent: Nov. 11, 2025

(54) SUPPLY SELECTION CIRCUIT WITH INPUT NOISE SUPPRESSION AND WIDE OPERATING RANGE

(71) Applicant: TEXAS INSTRUMENTS INCORPORATED, Dallas, TX (US)

(72) Inventors: Damian Panter, Freising (DE);
Carsten Ingo Stoerk, Freising (DE);
Florian Neveu, Neufahrn (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 86 days.

(21) Appl. No.: 18/338,824

(22) Filed: Jun. 21, 2023

(65) Prior Publication Data

US 2024/0427362 A1    Dec. 26, 2024

(51) Int. Cl.
*G05F 1/56* (2006.01)

(52) U.S. Cl.
CPC ....................................... *G05F 1/56* (2013.01)

(58) Field of Classification Search
CPC ................................. G05F 1/56; G05F 1/575
See application file for complete search history.

(56) References Cited

U.S. PATENT DOCUMENTS

| | | | |
|---|---|---|---|
| 6,522,190 B1* | 2/2003 | Malik | H02J 1/108 307/64 |
| 9,329,649 B2* | 5/2016 | Gasparini | G06F 1/26 |
| 11,199,864 B1* | 12/2021 | Yeh | G05F 1/468 |
| 11,405,030 B1* | 8/2022 | Mustafi | H03F 3/45269 |
| 2013/0062962 A1* | 3/2013 | Xue | H01F 38/14 307/104 |
| 2014/0139029 A1* | 5/2014 | Gasparini | G06F 1/26 307/80 |
| 2023/0155480 A1* | 5/2023 | Pan | H02M 3/158 323/282 |

* cited by examiner

*Primary Examiner* — Elim Ortiz
(74) *Attorney, Agent, or Firm* — Valerie M. Davis; Frank D. Cimino (57) ABSTRACT

In an example, a method includes enabling a first voltage supply and a second voltage supply. The method also includes selecting, with a decision comparator, a selected voltage supply from either the first voltage supply or the second voltage supply based on which of the first voltage supply or the second voltage supply ramps up first. The method includes monitoring the selected voltage supply with the decision comparator. The method also includes, responsive to a voltage from the selected voltage supply dropping below a dropout voltage level of a low dropout regulator, switching to an other voltage supply with the decision comparator.

24 Claims, 10 Drawing Sheets

SUPPLY SELECTION CIRCUIT WITH INPUT NOISE SUPPRESSION AND WIDE OPERATING RANGE

BACKGROUND

A power supply regulator, such as a low-dropout (LDO) regulator, may have two power supplies. On startup, one power supply is selected to power the regulator. A lower-voltage power supply may be selected for efficiency. A higher-voltage power supply may be selected for stability. Also, the power supply may be switched during operation if the currently selected power supply becomes unsuitable for the operation of the regulator. Hysteresis may be implemented to avoid frequent switching.

SUMMARY

In accordance with at least one example of the description, a system includes a first voltage supply terminal coupled to a first current source, the first current source coupled to a first diode. The system includes a second voltage supply terminal coupled to a second current source, the second current source coupled to a second diode. The system also includes a first transistor having a gate coupled to the first current source and the first diode, a drain coupled to the first voltage supply terminal, and a source coupled to a first input of a comparator. The system includes a second transistor having a gate coupled to the first current source and the first diode, a drain coupled to the first voltage supply terminal, and a source coupled to a first switch. The system also includes a third transistor having a gate coupled to the second current source and the second diode, a drain coupled to the second voltage supply terminal, and a source coupled to a second input of a comparator. The system includes a fourth transistor having a gate coupled to the second current source and the second diode, a drain coupled to the second voltage supply terminal, and a source coupled to a second switch. The comparator has a comparator output coupled to the first switch and the second switch, where the first switch and the second switch are coupled to an output voltage terminal.

In accordance with at least one example of the description, a system includes a first voltage supply terminal coupled to a first current source. The system also includes a second voltage supply terminal coupled to a second current source. The system includes a first transistor having a gate coupled to the first current source, a drain coupled to the first voltage supply terminal, and a source coupled to a first input of a comparator. The system also includes a second transistor having a gate coupled to the first current source, a drain coupled to the first voltage supply terminal, and a source coupled to a first switch. The system includes a third transistor having a gate coupled to the second current source, a drain coupled to the second voltage supply terminal, and a source coupled to a second input of a comparator. The system also includes a fourth transistor having a gate coupled to the second current source, a drain coupled to the second voltage supply terminal, and a source coupled to a second switch. The comparator has a comparator output coupled to the first switch and a second switch, where the first switch and the second switch are coupled to an output voltage terminal. The first transistor is configured to transfer a first voltage from the first voltage supply terminal to the first input of the comparator. The third transistor is configured to transfer a second voltage from the second voltage supply terminal to the second input of the comparator.

In accordance with at least one example of the description, a system includes a first voltage supply terminal coupled to a first current source. The system includes a second voltage supply terminal coupled to a second current source. The system also includes a first transistor having a gate coupled to the first current source, a drain coupled to the first voltage supply terminal, and a source coupled to a first input of a comparator. The system includes a second transistor having a gate coupled to the first current source, a drain coupled to the first voltage supply terminal, and a source coupled to a first switch. The system also includes a third transistor having a gate coupled to the second current source, a drain coupled to the second voltage supply terminal, and a source coupled to a second input of a comparator. The system includes a fourth transistor having a gate coupled to the second current source, a drain coupled to the second voltage supply terminal, and a source coupled to a second switch. The comparator has a comparator output coupled to the first switch and the second switch, where the first switch and the second switch are coupled to an output voltage terminal. The first transistor is configured to transfer a first voltage from the first voltage supply terminal to the first input of the comparator. The third transistor is configured to transfer a second voltage from the second voltage supply terminal to the second input of the comparator. The output voltage terminal is configured to provide an output voltage to a universal serial bus (USB) power delivery controller.

In accordance with at least one example of the description, a method includes enabling a first voltage supply and a second voltage supply. The method also includes selecting, with a decision comparator, a selected voltage supply from either the first voltage supply or the second voltage supply based on which of the first voltage supply or the second voltage supply ramps up first. The method includes monitoring the selected voltage supply with the decision comparator. The method also includes, responsive to a voltage from the selected voltage supply dropping below a dropout voltage level of a low dropout regulator, switching to another voltage supply with the decision comparator.

BRIEF DESCRIPTION OF THE DRAWINGS

The same reference numbers or other reference designators are used in the drawings to designate the same or similar (functionally and/or structurally) features.

DETAILED DESCRIPTION

A voltage regulator, such as an LDO, may have multiple voltage supplies. On startup, the LDO receives a voltage from one of the voltage supplies and generates the first internal voltage supply for a circuit, device, or system. The LDO should provide a stable and noise-reduced voltage output. On startup, the LDO may have limited resources, because much of the circuitry is not yet enabled, due to the LDO providing the first internal voltage supply. Because of the limited resources at startup, digital processors are not available at startup to execute digital algorithms for selecting the voltage supply for the LDO. Also, at startup, the LDO does not need to deliver high power, as lower-power circuits are often powered on first.

Existing LDOs may use resistive dividers to determine which voltage supply is greater at startup and during operation. A decision comparator compares the voltages provided by the voltage supplies and chooses a suitable supply. Disturbances in the voltage values provided by the voltage supplies are propagated linearly to the decision comparator. To avoid frequent switching between the voltage supplies (e.g., supply hopping, which generates noise), the decision comparator uses a large hysteresis. However, a large hysteresis limits the minimum supply voltage that is sufficient to keep the LDO in regulation. Therefore, a tradeoff occurs between the minimum supply voltage provided to the LDO and supply hopping between the voltage supplies due to the hysteresis of the decision comparator.

In examples herein, the tradeoff described above between the minimum supply voltage and supply hopping is overcome by having a non-linear transfer characteristic from the supply voltage to the voltage that the decision comparator receives. The voltages from the voltage supplies received at the inputs of the decision comparator are called voltage reference signals herein. For example, if the supply voltage for a first voltage supply is 3 volts (V), a value other than 3 V (e.g., the voltage reference signal) is provided to the decision comparator. The voltage reference signal is a non-linear representation of the supply voltage provided by the voltage supply (e.g., 3 V). Providing a voltage reference signal at the input of the decision comparator, rather than the voltage provided by the voltage supply (3 V), allows a smaller hysteresis to be implemented for the decision comparator without giving up the benefit of reduced switching, which is experienced with a larger hysteresis. With a smaller hysteresis, a lower minimum supply voltage may be provided to the LDO.

In examples herein, a current source, diodes, and transistors provide the voltage reference signals from the voltage supplies to the inputs of the decision comparator, rather than resistive dividers. This circuitry described herein provides a clamping or saturating characteristic for the voltage reference signals. If the voltage provided by the voltage supply is above a dropout level of the LDO, the voltage reference signal (at the input of the decision comparator) will only slightly change (by a few hundred microvolts or one millivolt) responsive to changes in the voltage provided by the voltage supply. In an example, the reference voltage signal may only change a few hundred microvolts or one millivolt responsive to a large change in the supply voltage. Therefore, hysteresis may be greatly reduced. The hysteresis only needs to be greater than the mismatch related to differences in the voltage reference signals for proper operation. In one example, the decision comparator locks onto the first available supply voltage and changes only if the selected supply voltage drops below the dropout level of the LDO.

Figure 1A:
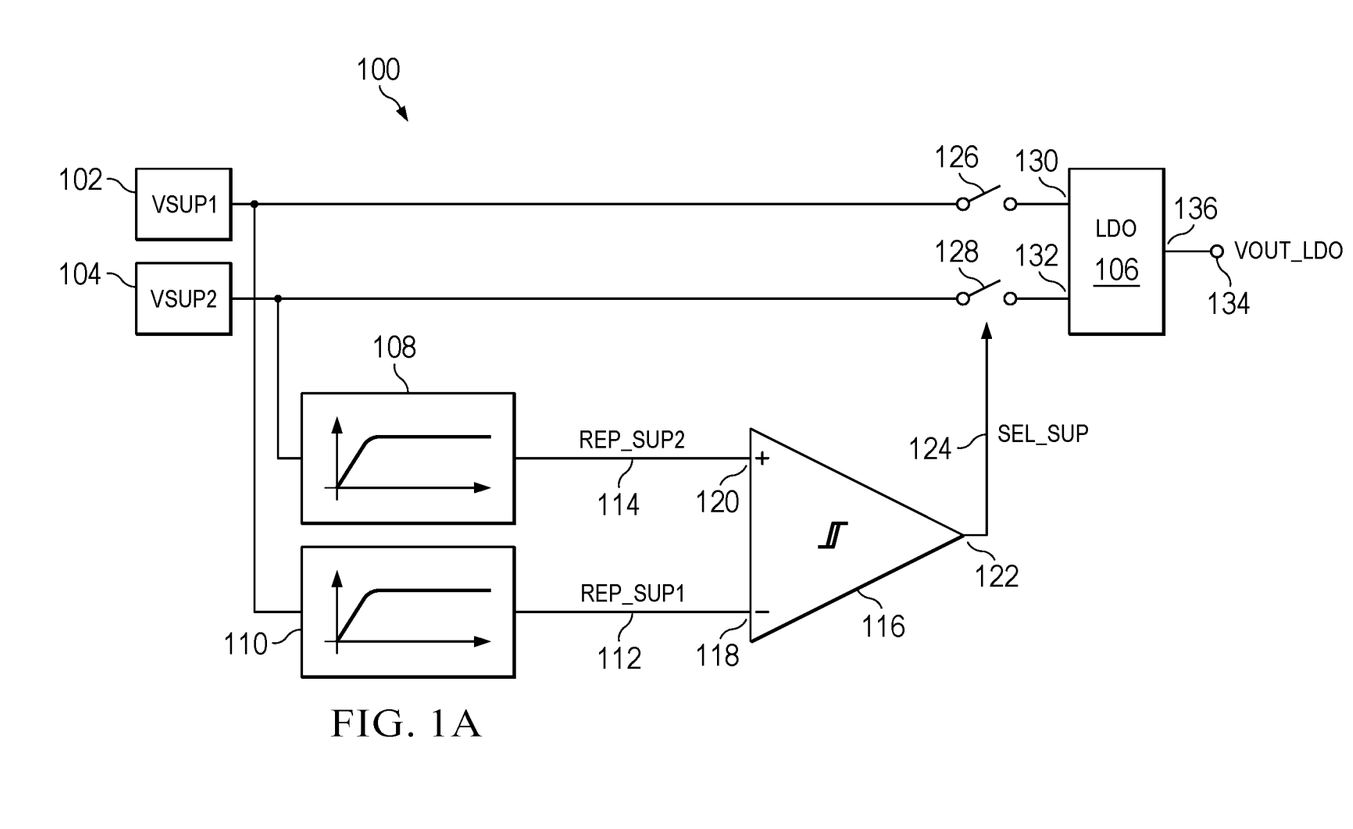
FIG. 1A is a block diagram of a supply selection circuit in accordance with various examples.

FIG. 1A is a block diagram of a supply selection circuit 100 in accordance with various examples herein. Supply selection circuit 100 includes a first voltage supply 102 and a second voltage supply 104. First voltage supply 102 may be a first voltage supply terminal, and second voltage supply 104 may be a second voltage supply terminal. One of the voltage supplies is selected to provide a supply voltage to the LDO 106. The first voltage supply 102 provides a voltage VSUP1. The second voltage supply 104 provides a voltage VSUP2. Supply selection circuit 100 includes non-linear transfer circuitry 108 and non-linear transfer circuitry 110. Non-linear transfer circuitry 110 receives the voltage VSUP1 from first voltage supply 102 at an input and produces a voltage reference signal (REP_SUP1) 112 at an output. The voltage reference signal REP_SUP1 112 is a voltage signal that varies non-linearly with changes to the voltage VSUP1. Non-linear transfer circuitry 108 receives the voltage VSUP2 from second voltage supply 104 at an input and produces a voltage reference signal (REP_SUP2) 114 at an output. The voltage reference signal REP_SUP2 114 is a voltage signal that varies non-linearly with changes to the voltage VSUP2. One example of the circuitry within non-linear transfer circuitry 108 and non-linear transfer circuitry 110 is described with respect to FIG. 2 below.

Supply selection circuit 100 also includes decision comparator 116. Decision comparator 116 has a first input 118, a second input 120, and a comparator output 122. Decision comparator 116 receives REP_SUP1 112 at first input 118 and REP_SUP2 114 at second input 120. Decision comparator 116 chooses one of the inputs based on a selection criteria, such as the first input to reach a predetermined threshold, such as a predetermined voltage level. Then, decision comparator 116 provides an output signal SEL_SUP 124 at comparator output 122. The SEL_SUP 124 signal is provided to one or more switches 126 and 128 to select a voltage supply for LDO 106. The switches 126 and 128 may be implemented with any suitable circuitry, such as transistors that are turned on or off based on the value of SEL_SUP 124. For a first value of SEL_SUP 124, switch 126 is closed, and first voltage supply 102 provides the supply voltage VSUP1 to LDO 106 at input 130. For a second value of SEL_SUP 124, switch 128 is closed, and second voltage supply 104 provides the supply voltage VSUP2 to LDO 106 at input 132. LDO 106 receives the selected supply voltage and produces an output voltage VOUT_LDO 134 at output 136 (e.g., an output voltage terminal).

In one example operation, decision comparator 116 receives REP_SUP1 112 and REP_SUP2 114 and chooses the input voltage that first reaches a predetermined threshold. If first voltage supply 102 starts up faster than second voltage supply 104, REP_SUP1 112 will reach the predetermined threshold first and decision comparator 116 will choose REP_SUP1 112. Likewise, if second voltage supply 104 starts up faster than first voltage supply 102, REP_SUP2 114 will reach the predetermined threshold first and decision comparator 116 will choose REP_SUP2 114. Decision comparator 116 then provides an output signal SEL_SUP 124 to select the appropriate switch 126, 128 to couple LDO 106 to the voltage supply that started up faster.

Non-linear transfer circuitry 108 and 110 provide a clamping function in one example. As a supply voltage such as VSUP1 rises, REP_SUP1 increases to a certain point and then stops rising. After that point, VSUP1 may continue to rise, but REP_SUP1 will rise only slightly, if at all. Therefore, the hysteresis of decision comparator 116 may be reduced. The clamping function is described further below with respect to FIGS. 2 and 3.

Decision comparator 116 continually monitors the voltage reference signals REP_SUP1 112 and REP_SUP2 114 to determine that the selected supply voltage (either VSUP1 or VSUP2) remains above the dropout level. If one of the supply voltages VSUP1 or VSUP2 falls below the dropout level, decision comparator 116 can switch to the other voltage supply to provide a supply voltage to LDO 106. This action is a consequence of the clamping characteristic created by the non-linear transfer circuitry 108 and 110. If the selected supply voltage remains above the dropout level, decision comparator 116 continues with the selected supply voltage, even if the non-selected supply voltage provides a higher voltage than the selected supply voltage. Therefore, decision comparator 116 avoids frequent supply hopping, which creates noise in the system.

Figure 1B:
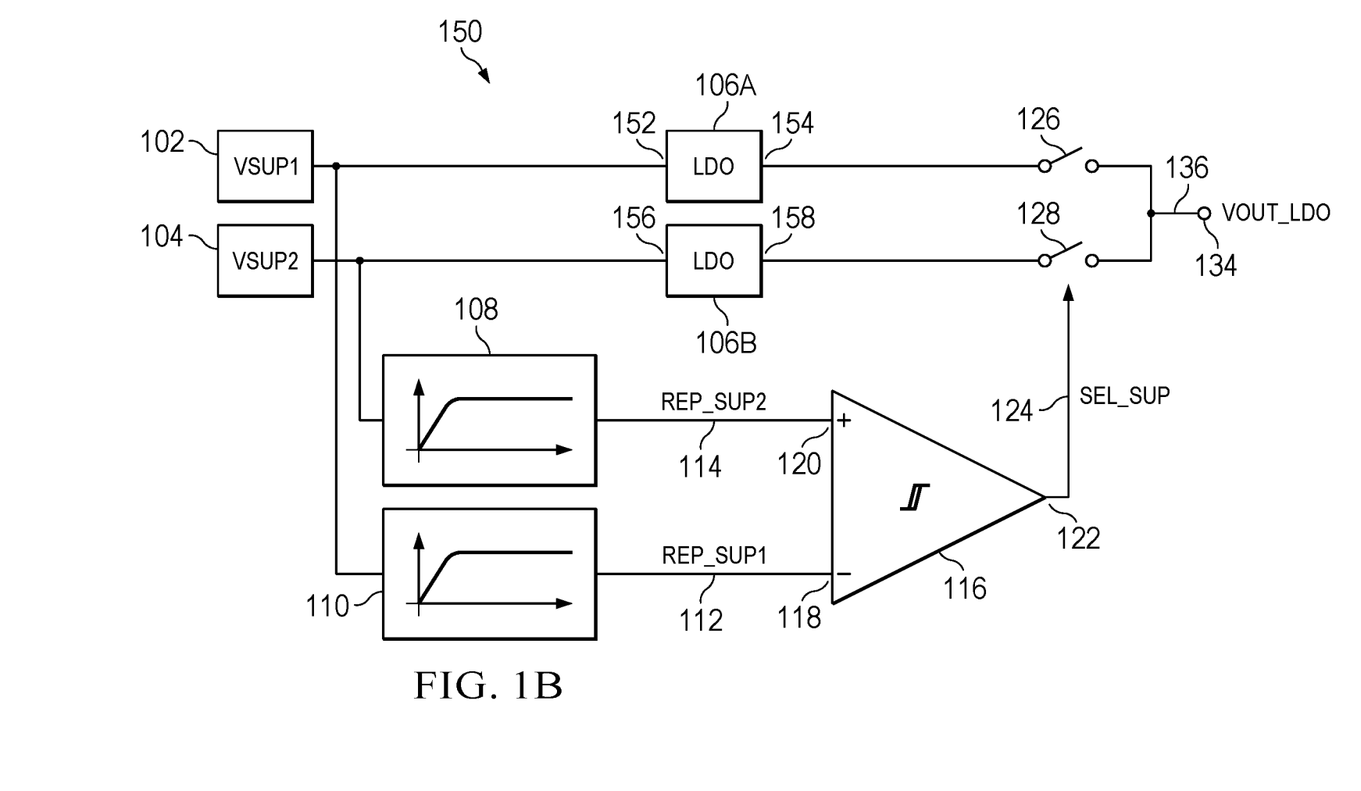
FIG. 1B is a block diagram of a supply selection circuit in accordance with various examples.

FIG. 1B is a block diagram of a supply selection circuit 150 in accordance with various examples herein. In FIG. 1B, most of the elements are described above with respect to FIG. 1A above, and like numerals denote like components. In supply selection circuit 150, two LDOs are present (LDO 106A and LDO 106B), and the LDOs are situated before switches 126 and 128.

In supply selection circuit 150, LDO 106A has an input 152 and an output 154. Input 152 is coupled to first voltage supply 102, and output 154 is coupled to switch 126. LDO 106B has an input 156 and an output 158. Input 156 is coupled to second voltage supply 104, and output 158 is coupled to switch 128.

The operation of supply selection circuit 150 is similar to supply selection circuit 100 described above. In one example operation, decision comparator 116 receives REP_SUP1 112 and REP_SUP2 114 and chooses the input voltage that first reaches a predetermined threshold. If first voltage supply 102 starts up faster than second voltage supply 104, REP_SUP1 112 will reach the predetermined threshold first and decision comparator 116 will choose REP_SUP1 112 (and LDO 106A) via switch 126. Likewise, if second voltage supply 104 starts up faster than first voltage supply 102, REP_SUP2 114 will reach the predetermined threshold first and decision comparator 116 will choose REP_SUP2 114 (and LDO 106B) via switch 128. Decision comparator 116 provides the output signal SEL_SUP 124 to select the appropriate switch 126, 128 to couple the selected LDO 106 (e.g., LDO 106A or LDO 106B) to output 136.

Figure 2:
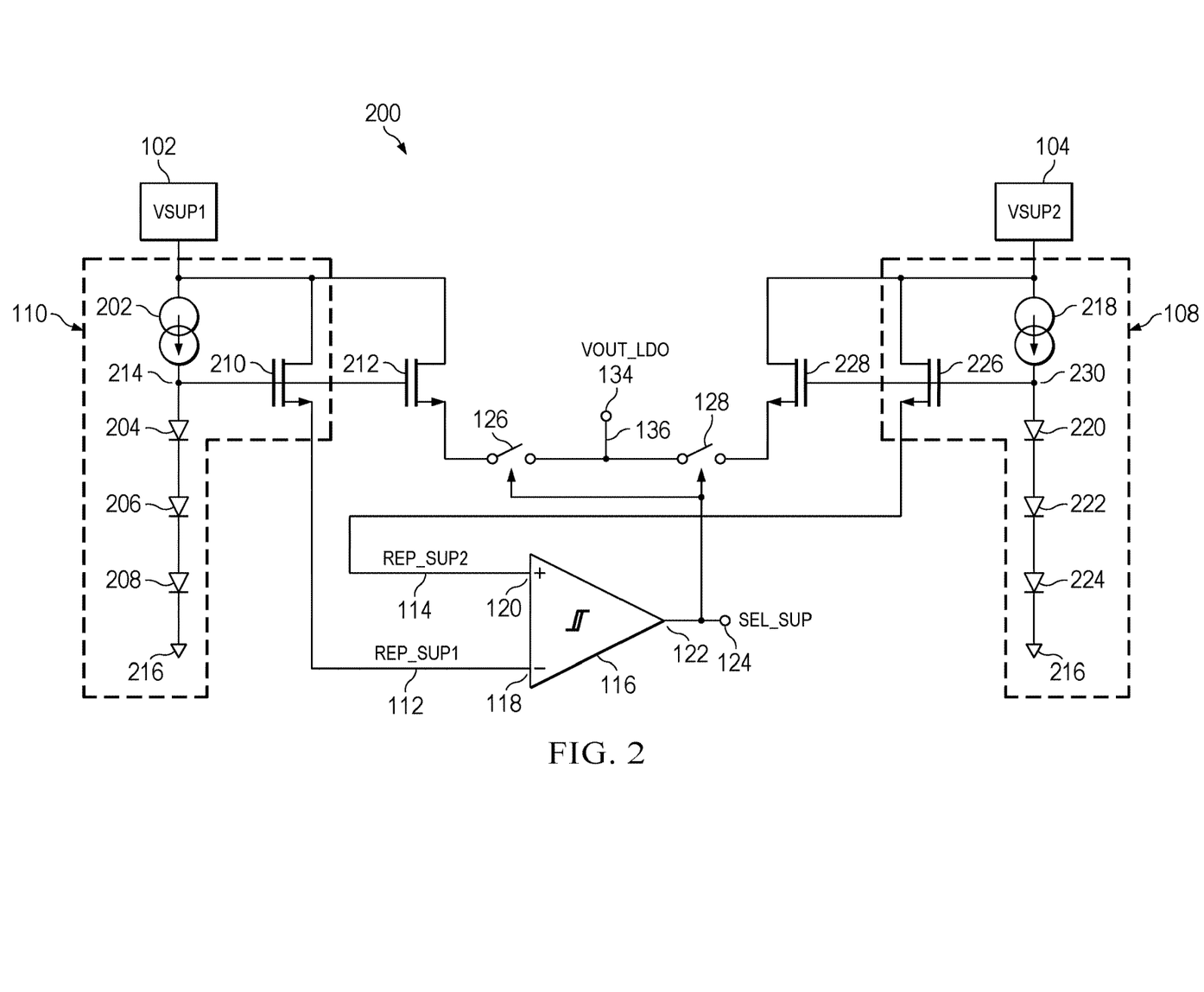
FIG. 2 is a diagram of a supply selection circuit in accordance with various examples.

FIG. 2 is a diagram of a supply selection circuit 200 in accordance with various examples herein. In FIG. 2, some of the elements are described above with respect to FIGS. 1A and 1B, and like numerals denote like components. The structure of FIG. 2 corresponds to FIG. 1B described above, which has two LDOs (106A and 106B). FIG. 2 includes first voltage supply 102, second voltage supply 104, non-linear transfer circuitry 108, non-linear transfer circuitry 110, decision comparator 116, switches 126 and 128, and output 136. These components operate as described above.

Supply selection circuit 200 shows one example of non-linear transfer circuitry 108 and 110. In this example, the circuitry within non-linear transfer circuitry 108 and 110 is identical. Non-linear transfer circuitry 110 includes current source 202, diodes 204, 206, and 208, transistor 210, and node 214. Current source 202 is coupled to first voltage supply 102 and node 214. Diodes 204, 206, and 208 are configured in series as shown, with diode 204 coupled to node 214, diode 206 coupled between diodes 204 and 208, and diode 208 coupled to ground 216. In other examples, more or fewer diodes could be present. Each diode could also be a transistor that has its gate terminal connected to its drain terminal in one example. A gate of transistor 210 is coupled to node 214. A drain of transistor 210 is coupled to first voltage supply 102. A source of transistor 210 is coupled to first input 118 of decision comparator 116. A gate of transistor 212 is coupled to the gate of transistor 210. A drain of transistor 212 is coupled to first voltage supply 102. A source of transistor 212 is coupled to switch 126.

Transistor 212, current source 202, and diodes 204, 206, and 208 are the components of LDO 106A (not labeled in FIG. 2). In this example, current source 202 and diodes 204, 206, and 208 are part of both LDO 106A and non-linear transfer circuitry 110. Transistor 212 is the pass device of LDO 106A that provides the supply voltage to output 136 if switch 126 is closed. Transistor 212 passes, transfers, or provides a voltage to output 136 based on the supply voltage, but the voltage at output 136 provided by transistor 212 may be a different value than the voltage provided by first voltage supply 102. In other examples, different diodes may be used for the LDO rather than reusing diodes 204, 206, and 208.

Transistors 210 and 212 may be N-type metal oxide semiconductor (NMOS) transistors in one example. In other examples, other types of transistors may be useful. Transistors 210 and 212 may be the same size or different sizes in examples herein. Transistor 210 may be sized appropriately to avoid loading diodes 204, 206, and 208. Transistor 210 may act as a buffer and a source follower in one example, with a high input impedance and a low output impedance. Transistor 212 may be sized to provide a desired current to output 136 if first voltage supply 102 is selected.

Non-linear transfer circuitry 108 is structured similarly to non-linear transfer circuitry 110 in this example. Non-linear transfer circuitry 108 includes current source 218, diodes 220, 222, and 224, transistor 226, and node 230. Current source 218 is coupled to second voltage supply 104 and node 230. Diodes 220, 222, and 224 are configured in series as shown. In other examples, more or fewer diodes could be present. Each diode could also be a transistor that has its gate terminal connected to its drain terminal in one example. A gate of transistor 226 is coupled to node 230. A drain of transistor 226 is coupled to second voltage supply 104. A source of transistor 226 is coupled to second input 120 of decision comparator 116. A gate of transistor 228 is coupled to the gate of transistor 226. A drain of transistor 228 is coupled to second voltage supply 104. A source of transistor 228 is coupled to switch 128.

Transistor 228, current source 218, and diodes 220, 222, and 224 are the components of LDO 106B (not labeled in FIG. 2). In this example, current source 218 and diodes 220, 222, and 224 are part of both LDO 106B and non-linear transfer circuitry 108. Transistor 228 is the pass device of LDO 106B that provides the supply voltage to output 136 if switch 128 is closed. Transistor 228 passes, transfers, or provides a voltage to output 136 based on the supply voltage, but the voltage at output 136 provided by transistor 228 may be a different value than the voltage provided by second voltage supply 104. In other examples, different diodes may be used for the LDO rather than reusing diodes 220, 222, and 224.

Transistors 226 and 228 may be NMOS transistors in one example. In other examples, other types of transistors may be useful. Transistors 226 and 228 may be the same size or different sizes in examples herein. Transistor 226 may be sized appropriately to avoid loading diodes 220, 222, and 224. Transistor 226 may act as a buffer and a source follower in one example, with a high input impedance and a low output impedance. Transistor 228 may be sized to provide a desired current to output 136 if second voltage supply 104 is selected.

Figure 3:
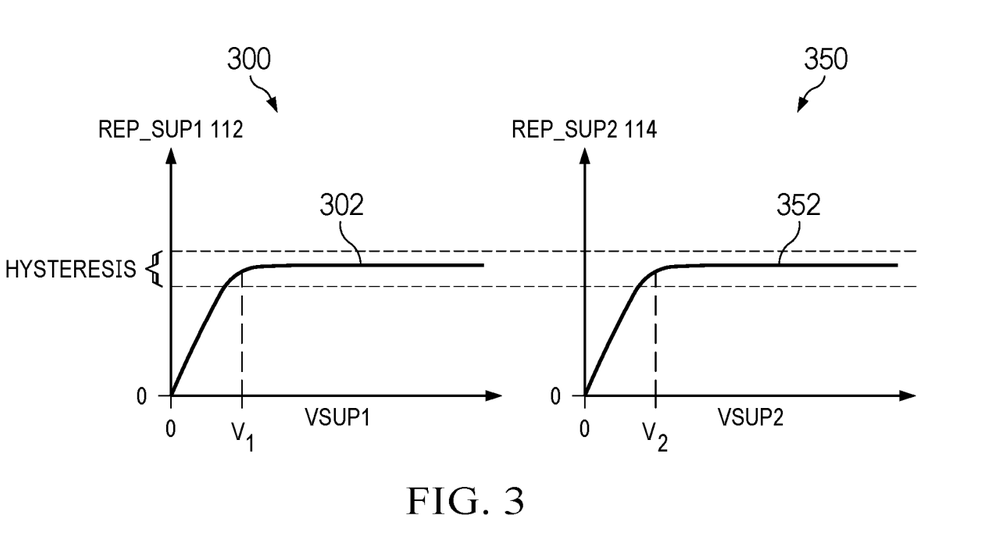
FIG. 3 includes example graphs of a non-linear transfer characteristics in accordance with various examples.

In an example operation of non-linear transfer circuitry 110, the diode stack (e.g., diodes 204, 206, and 208) and current source 202 generate a voltage at node 214 if first voltage supply 102 is on and providing a supply voltage VSUP1. The voltage at node 214 biases and turns on transistors 210 and 212. If transistor 210 is on, transistor 210 provides a voltage REP_SUP1 112 at its source terminal, which is provided to first input 118 of decision comparator 116. The voltage REP_SUP1 112 is a non-linear representation of the voltage VSUP1 provided by first voltage supply 102. As shown in FIG. 3 and described below, as VSUP1 rises, the voltage REP_SUP1 112 rises to a certain point and then stops rising. After that point, if VSUP1 continues to rise, REP_SUP1 112 remains relatively flat. Therefore, REP_SUP1 112 is a non-linear representation of VSUP1 provided to decision comparator 116. If decision comparator 116 selects first voltage supply 102 based on REP_SUP1 112, switch 126 is activated, and transistor 212 couples first voltage supply 102 to output 136.

Non-linear transfer circuitry 108 operates similarly to non-linear transfer circuitry 110. Diode 220, 222, and 224 and current source 218 generate a voltage at node 230 if second voltage supply 104 is on and providing a supply voltage VSUP2. The voltage at node 230 biases and turns on transistors 226 and 228. If transistor 226 is on, transistor 226 provides a voltage REP_SUP2 114 at its source terminal, which is provided to second input 120 of decision comparator 116. The voltage REP_SUP2 114 is a non-linear representation of the voltage VSUP2 provided by second voltage supply 104. As shown in FIG. 3 and described below, as VSUP2 rises, the voltage REP_SUP2 114 rises to a certain point and then stops rising. After that point, if VSUP2 continues to rise, REP_SUP2 114 remains relatively flat. Therefore, REP_SUP2 114 is a non-linear representation of VSUP2 provided to decision comparator 116. If decision comparator 116 selects second voltage supply 104 based on REP_SUP2 114, switch 128 is activated, and transistor 228 couples second voltage supply 104 to output 136.

In an example, on startup decision comparator 116 selects the voltage supply (102 or 104) that reaches a predetermined threshold first and triggers the output of the decision comparator 116. The output of decision comparator 116 (SEL_SUP 124) activates the appropriate switch (126 or 128) to couple the selected internal output voltage of the selected LDO 106 to output 136. The selected LDO (106A or 106B) provides an output voltage to output 136 as long as the selected supply voltage (associated with the selected LDO 106) remains above a dropout level for LDO 106. If the selected supply voltage drops below the dropout level, decision comparator 116 selects the other voltage supply (102 or 104) to continue providing the output voltage to output 136 from the other LDO 106. Therefore, decision comparator 116 avoids frequent supply hopping, which creates noise in the system.

FIG. 3 includes example graphs of the non-linear transfer characteristics in accordance with various examples herein. Graph 300 shows the relationship between VSUP1 and REP_SUP1 112. In graph 300, the x-axis represents VSUP1, and the y-axis represents REP_SUP1 112. Graph 350 shows the relationship between VSUP2 and REP_SUP2 114. In graph 350, the x-axis represents VSUP2, and the y-axis represents REP_SUP2 114. Graphs 300 and 350 are examples of a non-linear transfer characteristic, but other examples may be useful in other systems. For example, the clamping function could be flatter or more ideal, the curve may have more than two segments, etc.

Graph 300 includes a curve 302. Curve 302 shows the non-linear relationship between VSUP1 and REP_SUP1 112. Starting at 0 volts, as VSUP1 rises to a voltage V1, REP_SUP1 112 rises close to linearly with VSUP1. After the voltage V1, VSUP1 continues to rise, but REP_SUP1 112 stops rising as shown in curve 302. Non-linear transfer circuitry 110 provides a clamping effect, so REP_SUP1 112 remains within a narrow range above the voltage V1. An example hysteresis range is shown with horizontal dotted lines in FIG. 3. Because REP_SUP1 112 remains relatively flat within a narrow range above the voltage V1, a narrow hysteresis range may be used by decision comparator 116. If first voltage supply 102 is selected and VSUP1 remains above the bottom of the hysteresis range, decision comparator 116 will not toggle between the two voltage supplies 102 and 104.

Graph 350 shows a similar relationship as shown in graph 300. Graph 350 includes a curve 352. Curve 352 shows the non-linear relationship between VSUP2 and REP_SUP2 114. Starting at 0 volts, as VSUP2 rises to a voltage V2, REP_SUP2 114 rises close to linearly with VSUP2. After the voltage V2, VSUP2 continues to rise, but REP_SUP2 114 stops rising as shown in curve 352. Non-linear transfer circuitry 108 provides a clamping effect, so REP_SUP2 114 remains within a narrow range above the voltage V2. Because REP_SUP2 114 remains relatively flat within a narrow range above the voltage V2, a narrow hysteresis range may be used by decision comparator 116. If second voltage supply 104 is selected and VSUP2 remains above the bottom of the hysteresis range, decision comparator 116 will not toggle between the two voltage supplies 102 and 104. FIG. 3 therefore shows how a non-linear transfer characteristic creates a smaller hysteresis for decision comparator 116. A smaller hysteresis allows for a lower minimum supply voltage to be provided to the LDO 106.

Figure 4:
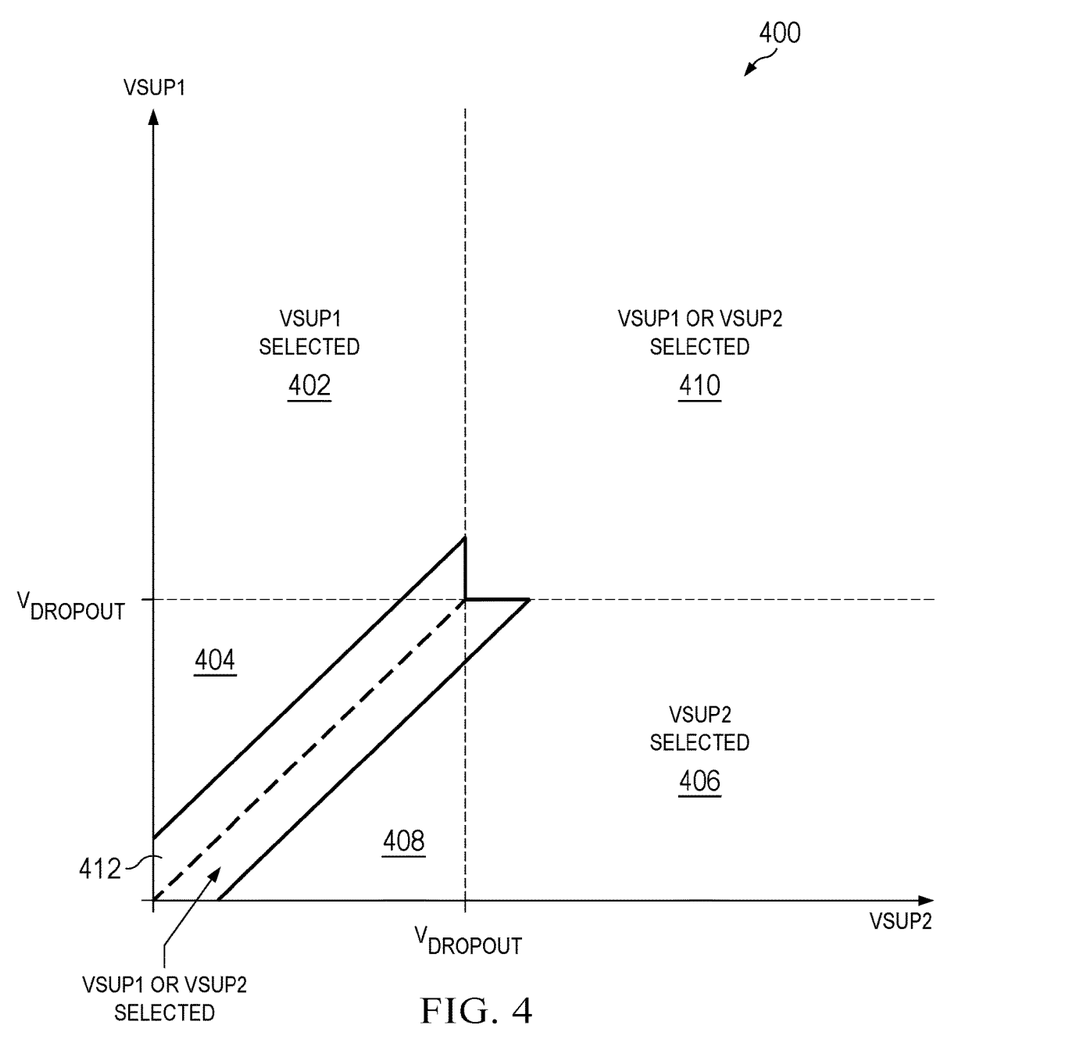
FIG. 4 is a supply selection graph in accordance with various examples.

FIG. 4 is a supply selection graph 400 in accordance with various examples herein. In supply selection graph 400, the y-axis represents VSUP1 (provided by first voltage supply 102) and the x-axis represents VSUP2 (provided by second voltage supply 104). The various sections of supply selection graph 400 indicate which of the voltage supplies 102 or 104 is selected, based upon their respective voltage levels. Supply selection graph 400 also includes a dropout voltage $V_{dropout}$ on both the x-axis and the y-axis. $V_{dropout}$ indicates the voltage at which the respective supply voltage has fallen below the dropout voltage of the LDO 106, and which may cause decision comparator 116 to switch to the other voltage supply.

If the voltages VSUP1 and VSUP2 are within section 402, VSUP 1 is relatively high and above $V_{dropout}$, while VSUP2 is relatively low and still below $V_{dropout}$. In that case, decision comparator 116 selects VSUP1 (first voltage supply 102). Decision comparator 116 continues with the selection of VSUP1 as long as VSUP1 remains above $V_{dropout}$, even if VSUP2 rises above VSUP1. This prevents unnecessary supply hopping.

If VSUP1 falls below $V_{dropout}$ into section 404, but VSUP2 also remains below $V_{dropout}$, decision comparator 116 will continue to select VSUP1. Even though VSUP1 is below $V_{dropout}$, VSUP2 is as well, so switching when the voltages are in section 404 will create noise without raising the supply voltage above $V_{dropout}$. Therefore, decision comparator 116 will remain with VSUP1 until VSUP 2 rises above VSUP1 plus the hysteresis. If VSUP1 recovers and rises above $V_{dropout}$ (into section 402) decision comparator 116 will continue to select VSUP1.

If VSUP1 is below $V_{dropout}$, and VSUP2 is above $V_{dropout}$, decision comparator 116 selects VSUP2 (e.g., section 406). If VSUP2 falls below $V_{dropout}$ into section 408, but VSUP1 also remains below $V_{dropout}$, decision comparator 116 will continue to select VSUP2, similar to the scenario described above with respect to section 404.

If both VSUP1 and VSUP2 are above $V_{dropout}$ at startup, decision comparator 116 can select either voltage supply (section 410). In one example, decision comparator 116 selects the voltage supply that reaches a predetermined threshold first (such as $V_{dropout}$). In another example, if both supply voltages are above $V_{dropout}$ before decision comparator 116 selects a voltage supply, decision comparator 116 may select either voltage supply (102 or 104) using any suitable criteria, such as selecting the higher supply voltage in one example. In another example, one of the voltage supplies 102 or 104 may be designated as a default selection if both supply voltages are above V dropout.

If the supply voltages are in section 412 on startup, neither supply voltage has reached V dropout. In that case, either supply voltage may be selected, but the decision comparator 116 may be sensitive to disturbances. The decision comparator 116 may select the voltage supply that has connected or enabled first. In an example, if VSUP1 is selected first, decision comparator 116 will switch to VSUP2 as soon as the corresponding hysteresis has been overcome. VSUP2 does not necessarily need to reach $V_{dropout}$.

Figure 5:
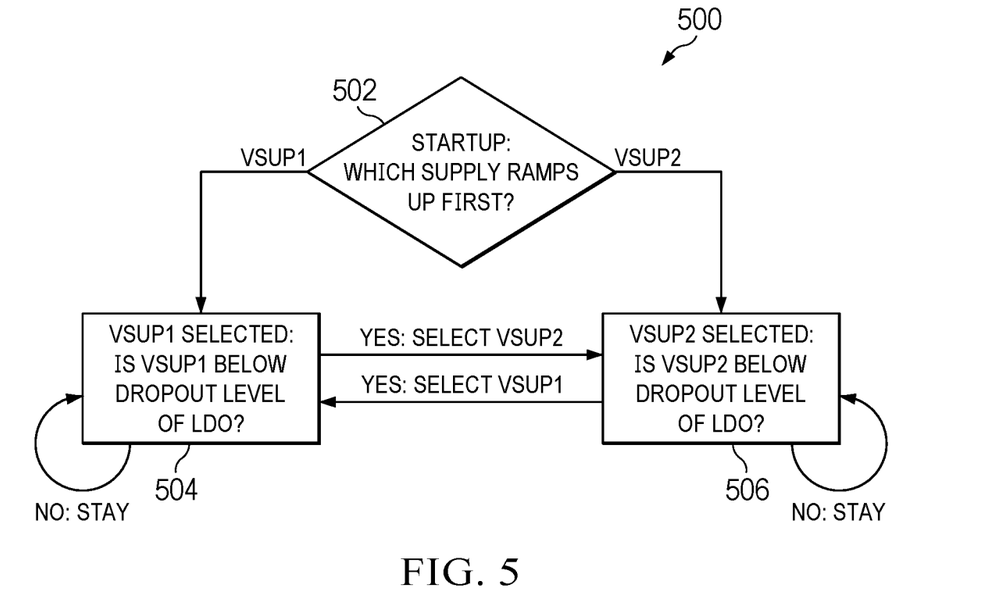
FIG. 5 is an example flow diagram of a method for selecting a supply voltage in accordance with various examples.

FIG. 5 is an example flow diagram of a method 500 for selecting a supply voltage in accordance with various examples herein. Method 500 begins at 502, where the decision comparator 116 determines which voltage supply ramps up first. If first voltage supply 102 ramps up first (VSUP1), the method proceeds to 504. If second voltage supply 104 ramps up first (VSUP2), the method proceeds to 506.

At 504, the decision comparator 116 monitors the voltages at its two inputs 118 and 120 (e.g., REP_SUP1 112 and REP_SUP2 114). If VSUP1 does not fall below the dropout level of the LDO (e.g., $V_{dropout}$), the method stays with the selection of VSUP1 at 504. If VSUP1 falls below the dropout level of the LDO, the method proceeds to 506, where decision comparator 116 selects VSUP2.

If second voltage supply 104 ramps up first in 502, the method proceeds to 506. At 506, the decision comparator 116 monitors the voltages at its two inputs 118 and 120 (e.g., REP_SUP1 112 and REP_SUP2 114). If VSUP2 does not fall below the dropout level of the LDO (e.g., $V_{dropout}$), the method stays with the selection of VSUP2 at 506. If VSUP2 falls below the dropout level of the LDO, the method proceeds to 504, where decision comparator 116 selects VSUP1. Therefore, as described above, decision comparator 116 stays with the selected voltage supply unless the selected supply voltage falls below $V_{dropout}$.

Figure 6:
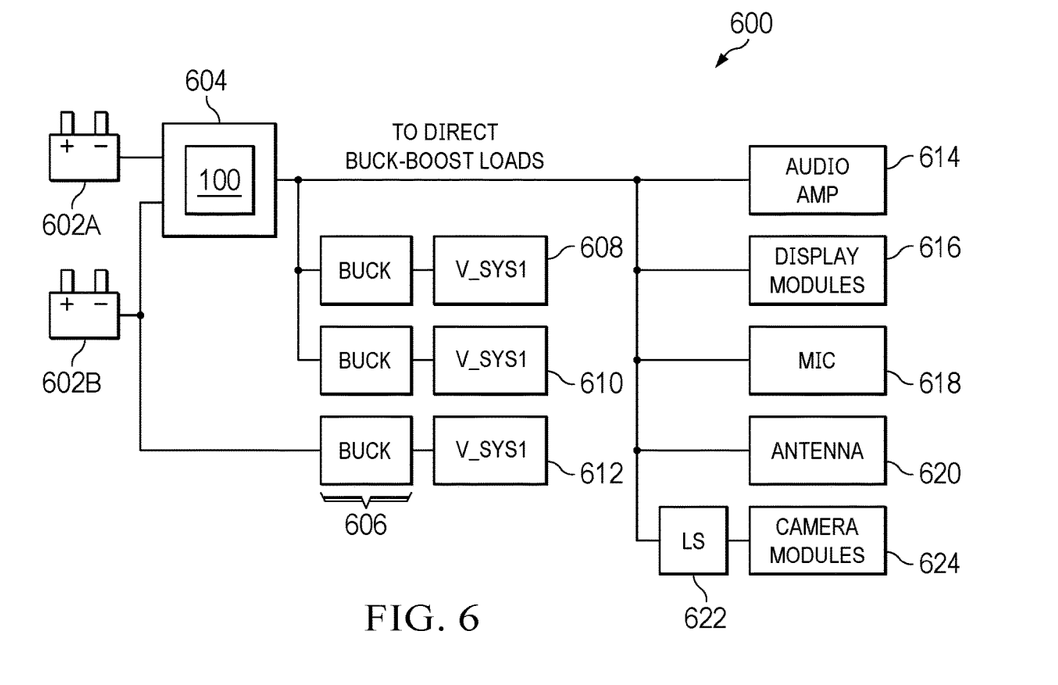
FIG. 6 is an example system including a supply selection circuit in accordance with various examples.

FIG. 6 is one example system 600 including a supply selection circuit in accordance with various examples herein. System 600 includes a buck-boost controller in an automotive system. However, the supply selection circuit described herein may be useful in any application that has two or more voltage supplies and chooses amongst them.

System 600 includes batteries 602A and 602B and a buck-boost controller 604. Batteries 602A and 602B represent two different power or voltage supplies. Buck-boost controller 604 includes a supply selection circuit 100 as described herein, where the supply selection circuit 100 selects between two or more voltage supplies. System 600 may include additional buck converters 606 that provide voltages to systems or systems on a chip, such as systems 608, 610, and 612. Buck-boost controller 604 may provide voltages to various subsystems of an automobile, including audio amplifier 614, display modules 616, microphone (MIC) 618, antenna 620, load switch (LS) 622, camera modules 624, and any other subsystem.

In one example operation, when starting an automobile engine in cold temperatures, the battery voltage may drop. With supply selection circuit 100, if the battery voltage does not drop far enough to trigger a power supply switch, then no additional noise is generated with the examples herein. If the battery voltage drops below the dropout voltage level of the LDO, the supply switches once, which minimizes noise.

Figure 7:
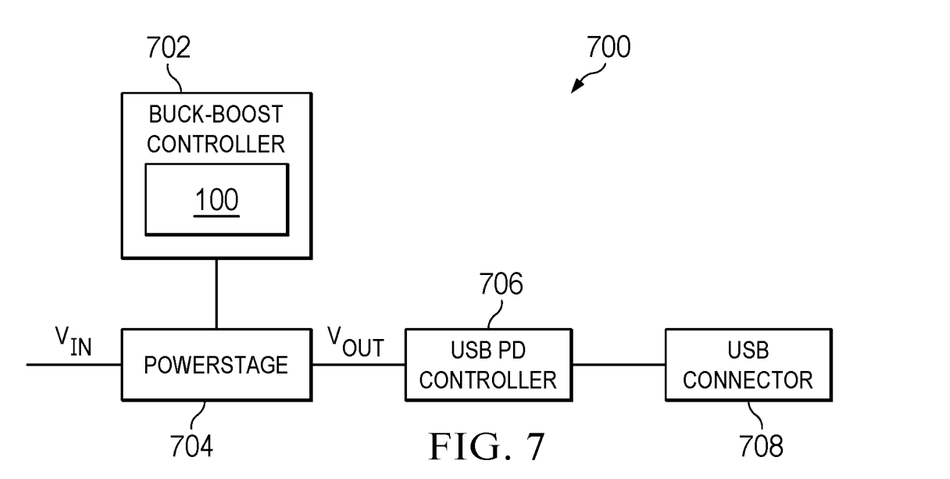
FIG. 7 is an example system including a supply selection circuit in accordance with various examples.

FIG. 7 is an example system 700 including a supply selection circuit in accordance with various examples herein. System 700 includes a buck-boost controller in a universal serial bus power delivery (USB PD) system.

System 700 includes a buck-boost controller 702 that includes a supply selection circuit 100 as described herein. Supply selection circuit 100 can choose between multiple voltage supplies as described herein. Buck-boost controller 702 provides control signals to a powerstage 704. Powerstage 704 receives a voltage VIN and provides a voltage VOUT to a USB PD controller 706. USB PD controller 706 is coupled to USB connector 708. A USB PD controller 706 provides power delivery along with data over a single cable.

Figure 8A:
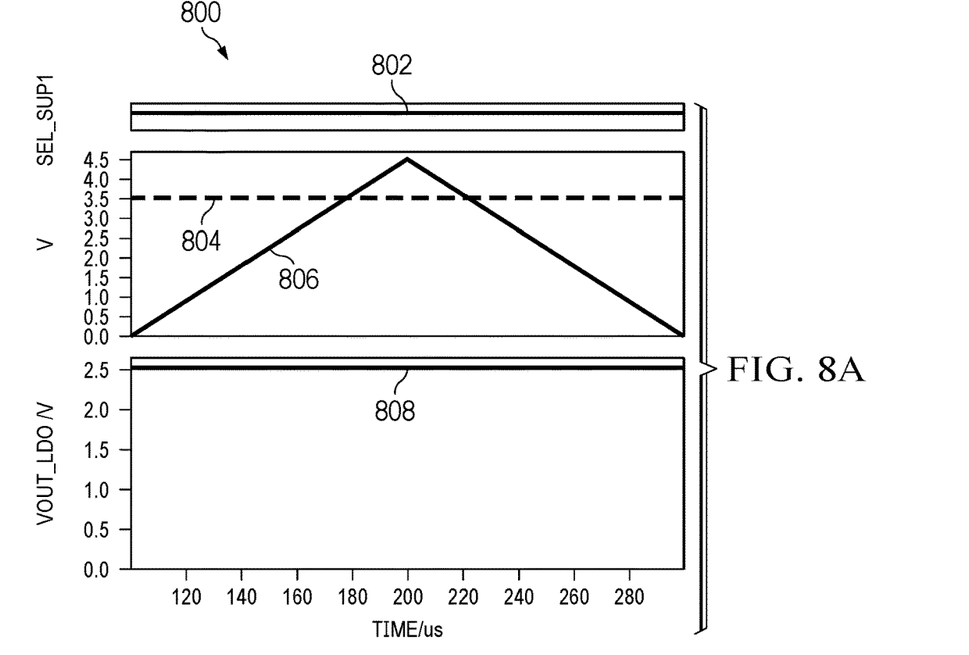
FIG. 8A are graphs showing supply selection in accordance with various examples herein.

FIG. 8A are graphs 800 showing supply selection in accordance with various examples herein. The y-axes represent voltage values, and the x-axis represents time in microseconds (μs). Curve 802 shows the supply selection signal (SEL_SUP1) that is output from the decision comparator 116. This signals selects first voltage supply 102 (VSUP1) when high, and selects second voltage supply 104 (VSUP2) when low.

Curve 804 shows the values of VSUP1, which is flat at 3.5 V in this example. Curve 806 shows the value of VSUP2, which is swept from 0 V to 4.5 V, then back down to 0 V. Curve 808 shows the value of the output voltage VOUT_LDO 134. Graphs 800 show that if VSUP1 is steady at 3.5 V. SEL_SUP1 does not change, which means the decision comparator 116 does not select second voltage supply 104 (VSUP2) because the first voltage supply 102 is sufficient to provide the desired output voltage VOUT_LDO 134. By remaining with first voltage supply 102 and not switching as long as first voltage supply 102 provides an appropriate output voltage, noise is reduced in the system.

Figure 8B:
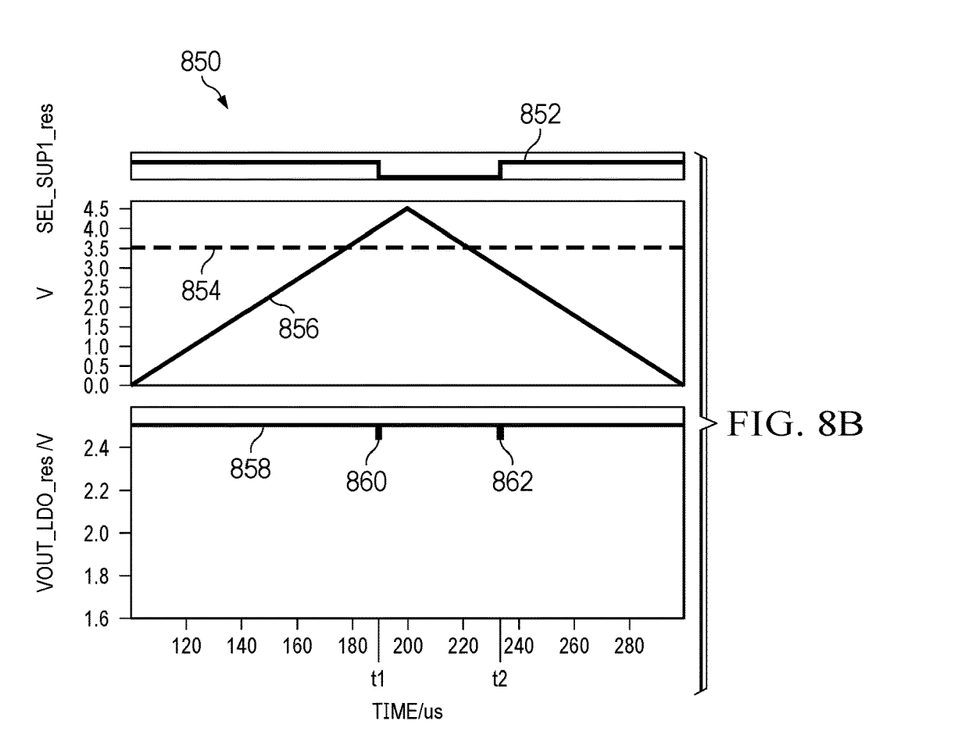
FIG. 8B are graphs showing supply selection with a resistive divider in accordance with various examples herein.

FIG. 8B are graphs showing supply selection with a resistive divider. The y-axes represent voltage values, and the x-axis represents time in μs. Curve 852 shows the supply selection signal (SEL_SUP1_res) that is output from a decision comparator in a system with a resistive divider. This signals selects a first power supply (VSUP1) when high, and selects second power supply (VSUP2) when low.

Curve 854 shows the values of VSUP1, which is flat at 3.5 V in this example. Curve 856 shows the value of VSUP2, which is swept from 0 V to 4.5 V, then back down to 0 V. Curve 858 shows the value of an output voltage VOUT_LDO. Graphs 850 show that if VSUP1 is steady at 3.5 V, and VSUP2 is swept up and down, a system with a resistive divider will switch to VSUP2 at time $t_1$ (approximately 187 μs), where SEL_SUP1_res 852 goes low. Then, the system will switch back to VSUP1 at time $t_2$ (approximately 232 μs), where SEL_SUP1_res 852 goes high. By switching at these times, even though VSUP1 (curve 854) is steady at 3.5 V and sufficient to provide the output voltage, noise is created at the output voltage (represented by glitches 860 and 862 in curve 858). Therefore, a system with a resistive divider may unnecessarily switch power supplies at certain times, which causes noise.

Figure 9:
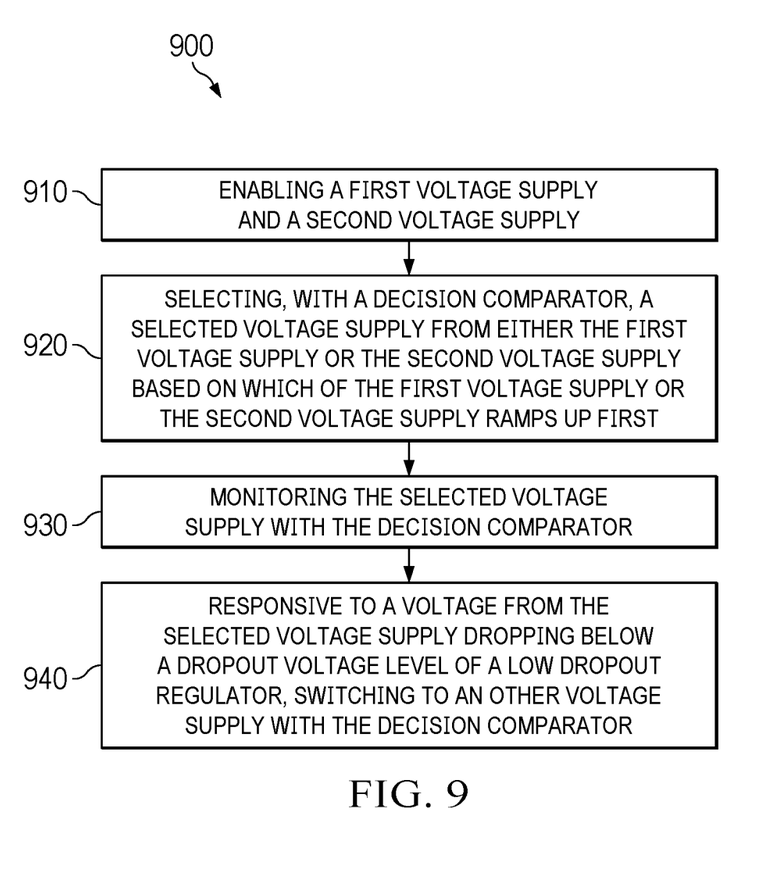
FIG. 9 is a flow diagram of a method for supply selection in accordance with various examples herein.

FIG. 9 is a flow diagram of a method 900 for supply selection in accordance with various examples herein. The steps of method 900 may be performed in any suitable order. The hardware components described above with respect to FIGS. 1A, 1B, and/or 2 may perform method 900 in some examples. Any suitable hardware, software, or digital logic may perform method 900 in some examples.

Method 900 begins at 910, where a first voltage supply and a second voltage supply are enabled. Method 900 continues at 920, where a decision comparator 116 selects a selected voltage supply from either the first voltage supply or the second voltage supply based on which of the first voltage supply or the second voltage supply ramps up first. As described above, a decision comparator 116 may receive a non-linear transfer characteristic from each voltage supply, and produce an output signal to select a voltage supply.

Method 900 continues at 930, where the decision comparator 116 monitors the selected voltage supply. The decision comparator 116 may switch to another voltage supply as described herein.

Method 900 continues at 940, where responsive to a voltage from the selected voltage supply dropping below a dropout voltage level of a low dropout regulator, the decision comparator 116 switches to the other voltage supply. As described above, the decision comparator 116 does not switch as long as the selected voltage supply is sufficient to provide the output voltage. By not switching unless needed, noise is reduced in the system.

In examples herein, the tradeoff described above between the minimum supply voltage and supply hopping is overcome by having a non-linear transfer characteristic from the supply voltage to the voltage that the decision comparator receives. In one example, a current source, diodes, and transistors provide the voltage reference signals from the voltage supplies to the inputs of the decision comparator, rather than resistive dividers. The circuitry described herein provides a clamping or saturating characteristic for the voltage reference signals. Therefore, hysteresis may be greatly reduced. The hysteresis only needs to be greater than the mismatch related differences in the voltage reference signals for proper operation. In one example, the decision comparator locks onto the first available supply voltage and changes only if the selected supply voltage drops below the dropout level of the LDO. High noise immunity may be achieved during operation due to less supply hopping. Also, an increased input voltage range may be provided with low input voltages in some examples.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus comprising:
a first current source having first and second terminals, the first terminal coupled to a first voltage supply terminal;
a first diode circuit coupled to the second terminal of the first current source;
a second current source having first and second terminals, the first terminal of the second current source coupled to a second voltage supply terminal;
a second diode circuit coupled to the second terminal of the second current source;
a first transistor having first and second terminals and a control terminal, the control terminal coupled to the second terminal of the first current source and to the first diode circuit, the first terminal of the first transistor coupled to the first voltage supply terminal;
a second transistor having first and second terminals and a control terminal, the control terminal of the second transistor coupled to the second terminal of the first current source and to the first diode circuit, the first terminal of the second transistor coupled to the first voltage supply terminal;

a third transistor having first and second terminals and a control terminal, the control terminal of the third transistor coupled to the second terminal of the second current source and to the second diode circuit, the first terminal of the third transistor coupled to the second voltage supply terminal;

a fourth transistor having first and second terminals and a control terminal, the control terminal of the fourth transistor coupled to the second terminal of the second current source and to the second diode circuit, the first terminal of the fourth transistor coupled to the second voltage supply terminal;

a comparator having first and second inputs and an output, the first input coupled to the second terminal of the first transistor, the second input coupled to the second terminal of the third transistor;

a first switch having first and second terminals and a control terminal, the first terminal of the first switch coupled to the second terminal of the second transistor, the control terminal of the first switch coupled to the output of the comparator; and a second switch having first and second terminals and a control terminal, the first terminal of the second switch coupled to the second terminal of the fourth transistor, the control terminal of the second switch coupled to the output of the comparator.

2. The apparatus of claim 1, wherein:

the first diode circuit includes one or more diodes coupled between the second terminal of the first current source and a ground terminal; and the second diode circuit includes one or more diodes coupled between the second terminal of the second current source and the ground terminal.

3. The apparatus of claim 1, further comprising:

a first low dropout regulator including the second transistor as part of an output stage; and a second low dropout regulator including the fourth transistor as part of an output stage.

4. The apparatus of claim 1, wherein the comparator is capable of:

receiving a first voltage at the first input;

receiving a second voltage at the second input;

comparing the first and second voltages to a threshold;

providing a signal to close the first switch to couple the first voltage supply terminal to an output terminal or close the second switch to couple the second voltage supply terminal to the output terminal responsive to a result of the comparing.

5. The apparatus of claim 1, further comprising a low dropout regulator including the second and fourth transistors and the first and second switches, and having an output voltage terminal coupled to the second terminals of the first and second switched.

6. A system comprising:

a first battery having an output;

a first current source having first and second terminals, the first terminal coupled to the output of the first battery;

a second battery having an output;

a second current source having first and second terminals, the first terminal of the second current source coupled to the output of the second battery;

a first transistor having first and second terminals and a control terminal, the control terminal coupled to the second terminal of the first current source, the first terminal of the first transistor coupled to the output of the first battery;

a second transistor having first and second terminals and a control terminal, the control terminal of the second transistor coupled to the second terminal of the first current source, the first terminal of the second transistor coupled to the output of the first battery;

a third transistor having first and second terminals and a control terminal, the control terminal of the third transistor coupled to the second terminal of the second current source, the first terminal of the third transistor coupled to the output of the second battery;

a fourth transistor having first and second terminals and a control terminal, the control terminal of the fourth transistor coupled to the second terminal of the second current source, the first terminal of the fourth transistor coupled to the output of the second battery;

a comparator having first and second inputs and an output, the first input coupled to the second terminal of the first transistor, the second input coupled to the second terminal of the third transistor;

a first switch having first and second terminals and a control terminal, the first terminal of the first switch coupled to the second terminal of the second transistor, the control terminal of the first switch coupled to the output of the comparator, the second terminal of the first switch coupled to an output terminal; and a second switch having first and second terminals and a control terminal, the first terminal of the second switch coupled to the second terminal of the fourth transistor, the control terminal of the second switch coupled to the output of the comparator, the second terminal of the second switch coupled to the output terminal.

7. The system of claim 6, wherein the comparator is capable of providing a first control signal to close the first switch to couple the first battery to the output terminal or providing a second control signal to close the second switch to couple the second battery to the output terminal.

8. The system of claim 7, wherein the comparator is capable of providing the first control signal responsive to a first voltage at the second terminal of the first transistor reaching a threshold before a second voltage at the second terminal of the third transistor.

9. The system of claim 8, wherein the threshold is a first threshold, and the comparator is further capable of providing the second control signal responsive to the first voltage falling below a second threshold.

10. The system of claim 7, wherein the comparator is capable of providing the second control signal responsive to a second voltage at the second terminal of the third transistor reaching a threshold before a first voltage at the second terminal of the first transistor.

11. The system of claim 10, wherein the threshold is a first threshold, and the comparator is further capable of providing the first control signal responsive to the second voltage falling below a second threshold.

12. The system of claim 6, further comprising:

a first diode coupled to the second terminal of the first current source; and a second diode coupled to the second terminal of the second current source.

13. The system of claim 6, further comprising a load circuit directly connected to the output terminal.

14. The system of claim 6, further comprising a buck converter having an input coupled to the output terminal.

15. A system comprising:
a first voltage supply having an output;
a first current source having first and second terminals, the first terminal coupled to the output of the first voltage supply;
a second voltage supply having an output;
a second current source having first and second terminals, the first terminal of the second current source coupled to the output of the second voltage supply;
a first transistor having first and second terminals and a control terminal, the control terminal coupled to the second terminal of the first current source, the first terminal of the first transistor coupled to the output of the first voltage supply;
a second transistor having first and second terminals and a control terminal, the control terminal of the second transistor coupled to the second terminal of the first current source, the first terminal of the second transistor coupled to the output of the first voltage supply;
a third transistor having first and second terminals and a control terminal, the control terminal of the third transistor coupled to the second terminal of the second current source, the first terminal of the third transistor coupled to the output of the second voltage supply;
a fourth transistor having first and second terminals and a control terminal, the control terminal of the fourth transistor coupled to the second terminal of the second current source, the first terminal of the fourth transistor coupled to the output of the second voltage supply;
a comparator having first and second inputs and an output, the first input coupled to the second terminal of the first transistor, the second input coupled to the second terminal of the third transistor;
a first switch having first and second terminals and a control terminal, the first terminal of the first switch coupled to the second terminal of the second transistor, the control terminal of the first switch coupled to the output of the comparator, the second terminal of the first switch coupled to an output terminal;
a second switch having first and second terminals and a control terminal, the first terminal of the second switch coupled to the second terminal of the fourth transistor, the control terminal of the second switch coupled to the output of the comparator, the second terminal of the second switch coupled to the output terminal; and
a universal serial bus (USB) power delivery controller having an input coupled to the output terminal, and having an output.

16. The system of claim 15, further comprising a USB connector coupled to the output of the USB power delivery controller.

17. The system of claim 15, wherein the comparator is capable of provide a first control signal to close the first switch to couple the first voltage supply to the output terminal or provide a second control signal to close the second switch to couple the second voltage supply to the output terminal.

18. The system of claim 17, wherein the comparator is capable of providing the first control signal responsive to a first voltage at the second terminal of the first transistor reaching a threshold before a second voltage at the second terminal of the third transistor.

19. The system of claim 18, wherein the threshold is a first threshold, and the comparator is further configured capable of providing the second control signal responsive to the first voltage falling below a second threshold.

20. The system of claim 15, further comprising:
a first diode coupled to the second terminal of the first current source; and
a second diode coupled to the second terminal of the second current source.

21. A method, comprising:
receiving a first signal through a first transistor coupled to a first voltage supply;
receiving a second signal through a second transistor coupled to a second voltage supply;
comparing the first and second signals to a first threshold and a second threshold;
coupling the first voltage supply to an output terminal through a third transistor responsive to the first signal exceeding a threshold;
and
responsive to the first signal falling below a dropout voltage level of a low dropout regulator, decoupling the first voltage supply from the output terminal, and coupling the second voltage supply to the output terminal through a fourth transistor.

22. The method of claim 21, further comprising:
responsive to the first signal remaining above the dropout voltage level of the low dropout regulator, maintaining the coupling of the first voltage supply to the output terminal.

23. The method of claim 21, wherein:
the first signal is based on a non-linear transfer characteristic of the first voltage supply; and
the second signal is based on a non-linear transfer characteristic of the second voltage supply.

24. The method of claim 21, further comprising providing a control signal to close a switch to coupled the first voltage supply to the output terminal.

* * * * *